T. M. DAVEY.
DETACHABLE TREAD FOR AUTOMOBILE TIRES.
APPLICATION FILED FEB. 16, 1907.
938,371.
Patented Oct. 26, 1909.
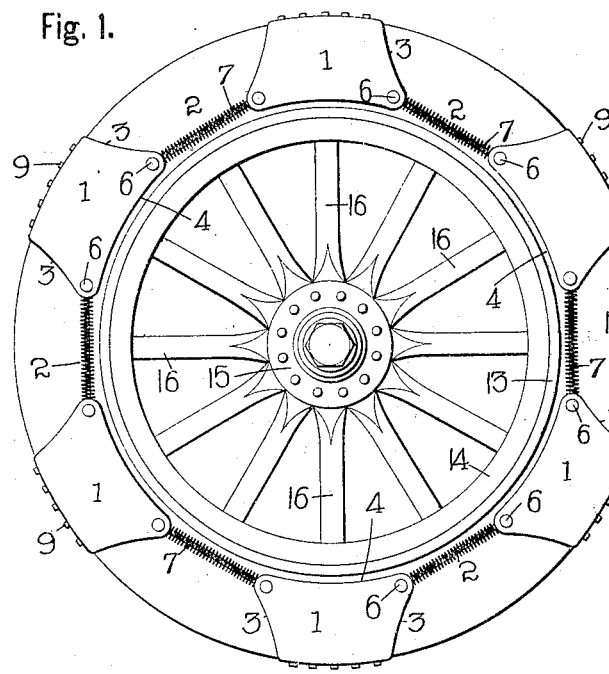
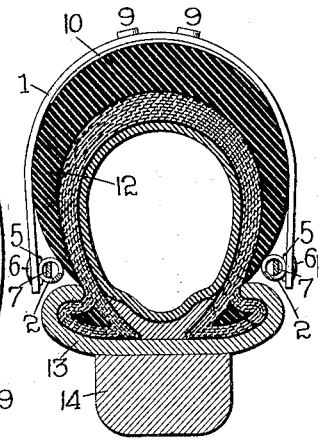
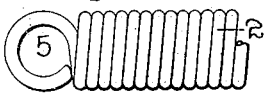
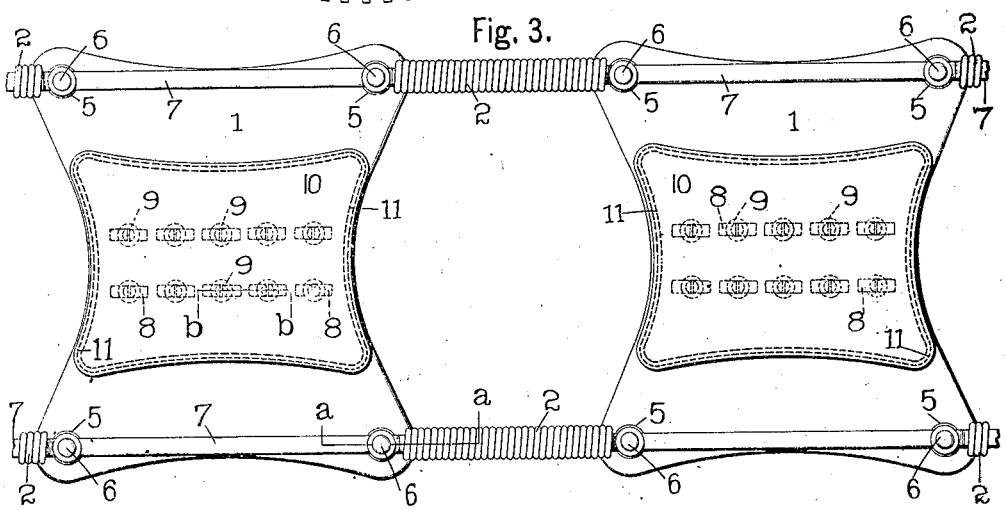
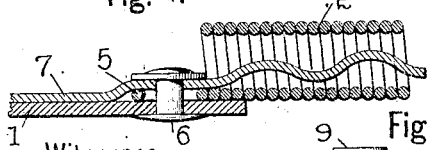
Witnesses.
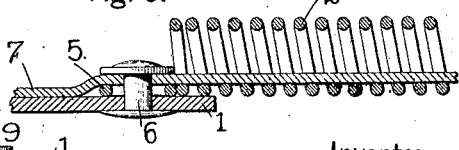
Inventor.
Townshend M. Davey.

UNITED STATES PATENT OFFICE.

TOWNSHEND M. DAVEY, OF BUFFALO, NEW YORK.

DETACHABLE TREAD FOR AUTOMOBILE-TIRES.

938,371. Specification of Letters Patent. Patented Oct. 26, 1909.

Application filed February 16, 1907. Serial No. 357,619.

*To all whom it may concern:*

Be it known that I, TOWNSHEND M. DAVEY, a citizen of the United States, residing at Buffalo, in the county of Erie and State of New York, have invented a certain new and useful Improvement in Detachable Treads for Automobile-Tires, of which the following is a specification.

This invention relates to an improved detachable tread for automobile tires and the like and the principal object of the invention is to provide a device of this class that may be very quickly attached to or detached from a tire.

A preferred adaptation of the invention is shown in the accompanying drawings, in which,—

Figure 1 is a side view of an automobile wheel and tire equipped with the improved detachable tread. Fig. 2 is an enlarged transverse section through an automobile tire showing the improved detachable tread in place thereon. Fig. 3 is an enlarged fragmentary detachable inside view of the improved detachable tread. Fig. 4 is an enlarged section on line $a\,a$, Fig. 3. Fig. 5 is a similar view showing the spring extended. Fig. 6 is an enlarged section on line $b\,b$, Fig. 3. Fig. 7 is a detached fragmentary view of one of the springs.

The adaptation of the invention shown is in the form of an endless band consisting of a series of sections 1 of tough flexible material such as raw hide or chrome tanned leather, and coil springs 2 elastically connecting the sections together at their corners. Each of the sections is in form nearly square with each of its edges concaved so that its transverse end edges will fit snugly to the tire surface as shown at 3 in Fig. 1, and its longitudinal side edges will curve in correspondence with the rim of the wheel as shown at 4 in Fig. 1.

The coil springs 2, which constitute longitudinal contractile members are formed of spring wire of any suitable metal that possesses the necessary qualities. The coil springs 2, are provided with end loops 5 through which rivets 6, are fitted to fasten the ends of the springs to the corners of the flexible sections. The springs are limited in their expansion by means which are not elastic in the direction of their length but is preferably possessed of flexibility to permit bending and preferably consists of strong thongs 7 which extend through the coil springs and are fastened to the corners of the section by the same rivets 6, that secure the spring ends thereto. The thongs 7 also extend along the longitudinal side edges of the sections to strengthen the same against longitudinal strain and thus extend entirely around the circumference of a wheel when the tread is fitted over a tire on said wheel.

The limiting action of the thongs 7 with respect to the expansion of the springs is illustrated in Figs. 4 and 5, the spring being in contracted position in Fig. 4 with the thong loose and in expanded position in Fig. 5 with the thong taut. The object of the thongs is to prevent breakage of the springs from excessive expansion and also to additionally strengthen the device completely around both of its side edges. The thongs are formed of raw hide leather or other suitable material. The central portions of the sections may be provided with a series of rivets 8, having thick heads 9, which project on the outer surface of the sections to provide means for securing a better tractive effect. To prevent those portions of the rivets on the inner surface of the section from in anyway injuring the tire surface, a lining 10, covering the portion may be attached by rows of sewing 11, to the section as shown in Figs. 3 and 6. The lining 10, may be made of raw hide or of any other suitable material possessing the requisite qualities of strength, toughness and flexibility.

In Figs. 1 and 2 this improved tread is illustrated as applied in position upon a pneumatic tire 12 of the clencher type which is attached to a rim 13 fitted on a felly 14. In Fig. 1, a wheel of well known construction is shown composed of a hub 15, spokes 16 and the felly 14, and rim 13 shown in Fig. 2. The device is fitted in place by simply springing it over a tire that is by enlarging it sufficiently circumferentially by extending or lengthening the coil springs to permit it to pass over the tire, and it is held in place by the constrictive action of the springs only.

When fitted in place on a pneumatic tire, the device is located as shown in Figs. 1 and 2, with the sections bent around the surface of the tire and the coil springs and thongs extending around the opposite sides of the tire and preferably just above the rim of the wheel. It is to be noted that the sections extend transversely of the tire and are located at intervals and owing to their peculiar concaved form and the yielding manner in which they are tensioned upon the tire they conform perfectly to the rounding configuration of the tire and their transverse edges fit closely to the outer surface and in a large measure prevent the interposition of dirt, stones, clay and other substances between the sections and the tire surface.

The great advantage of this device aside from the great strength and simplicity of its construction resides in the ease and quickness with which it can be attached to or detached from a wheel. This is due to the fact that it can be expanded circumferentially which permits it to be enlarged sufficiently to be sprung on or off a tire. As the tread is yieldingly held in place upon the tire, it will automatically accommodate itself to the change of contour of a pneumatic automobile tire over which it is fitted and thus fit snugly against the surface under all conditions.

The device not only serves to prevent skidding on slippery or wet pavements but also actually acts as a protector for the tire itself relieving and preventing wear to an appreciable extent.

I claim as my invention.

1. A device of the class described in the form of an endless band composed of sections of flexible material, coil springs connected at their ends to the corners of said sections and thongs for limiting the expansion of said springs.

2. A device of the class described in the form of an endless band composed of sections of flexible material, coil springs and endless thongs extending entirely around the sides of the band and through the coil springs, and rivets at each corner of the sections for fastening the ends of the coil springs and the thongs to the sections, substantially as set forth.

TOWNSHEND M. DAVEY.

Witnesses:
L. M. SANGSTER,
GEORGE A. NEUBAUER.